Sept. 23, 1924.  1,509,240
V. C. KLOEPPER
AUTOMOBILE LUBRICATION
Filed April 29, 1921   2 Sheets-Sheet 1
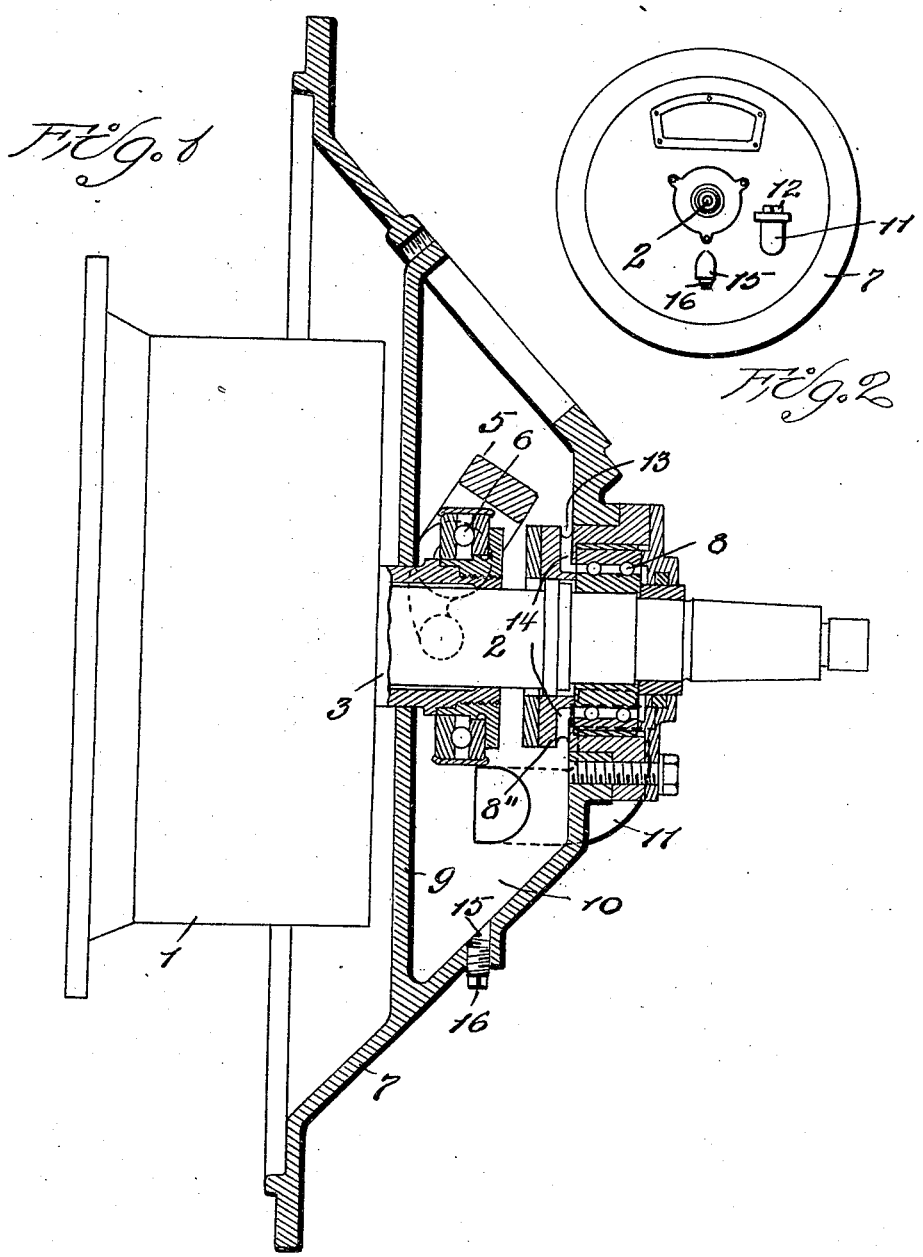
INVENTOR
VALENTINE C. KLOEPPER,
BY Ralph Kalish ATTORNEY.

Sept. 23, 1924.

V. C. KLOEPPER 1,509,240

AUTOMOBILE LUBRICATION

Filed April 29, 1921    2 Sheets-Sheet 2

INVENTOR
VALENTINE C. KLOEPPER,
by Ralph Kalish ATTORNEY.

Patented Sept. 23, 1924.

1,509,240

UNITED STATES PATENT OFFICE.

VALENTINE C. KLOEPPER, OF ST. LOUIS, MISSOURI, ASSIGNOR OF ONE-HALF TO A. J. KESSINGER, OF DETROIT, MICHIGAN.

AUTOMOBILE LUBRICATION.

Application filed April 29, 1921. Serial No. 465,567.

*To all whom it may concern:*

Be it known that I, VALENTINE C. KLOEPPER, a citizen of the United States, residing at the city of St. Louis, State of Missouri, have invented a certain new and useful Improvement in Automobile-Lubrication, of which the following is a specification, reference being had to the accompanying drawings, forming a part thereof.

This invention relates generally to automobiles and, more particularly, to a certain new and useful means for lubricating certain of the clutch operating-members and shaft-bearings associated with the power-transmission mechanism, the principal object of my present invention being to equip or provide the gear-clutch and transmission housings in a simple and inexpensive manner with a readily filled lubricant well or basin, whereby certain of the clutch operating-members and shaft-bearings will, from a relatively great supply-source, be lubricated continuously and efficiently and with a minimum of care and attention.

With the above and other objects in view, my present invention resides in the novel features of form, construction, arrangement, and combination of parts hereinafter described and afterwards pointed out in the claims.

In the accompanying drawings,

Figure 1 is a sectional elevation of a gear-clutch casing equipped or formed as a unit with a lubricant-well embodying my invention;

Figure 2 is an end elevational view of the same on a reduced scale; and

Figure 3:
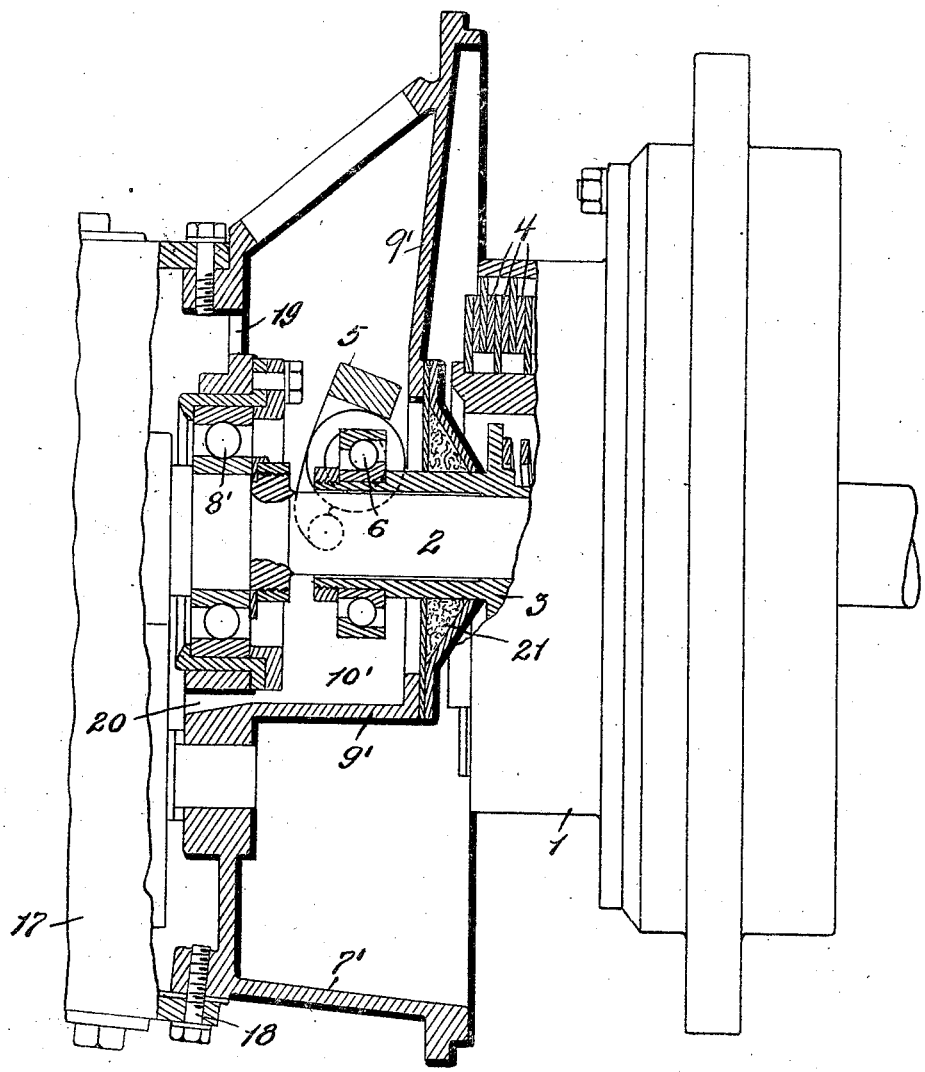
Figure 3 is a fragmental view, partly in side elevation and partly in section, of a gear-clutch and transmission housing or casing equipped or formed with a lubricant-well embodying my invention.

Referring now more in detail to the said drawings, which illustrate practical embodiments of my invention, and in which like reference characters refer to like parts throughout the several views, 1 indicates the clutch-drum, 2 the transmission-shaft, 3 the sleeve for yieldingly actuating the clutch-mechanism proper consisting of the friction-disks or members 4 housed in drum 1, 5 the operating lever for operating the sleeve 3, and 6 a ball-bearing connection between sleeve 3 and lever 5, whereby the shaft 2 and sleeve 3 may freely rotate relatively to lever 5, the parts mentioned being of any standard or approved construction.

With reference now to the so-called unit-type of construction illustrated in Figure 1, 7 is a substantially cone-shaped wall mounted suitably in connection with the drum 1, as shown and as is standard, to enclose or house the clutch-operating sleeve 3 and lever connection 6. At its apex, wall 7 is apertured to accommodate the shaft 2, and seated in the apertured apex of wall 7 to surround the shaft 2, is a suitable ball or other preferably anti-friction bearing 8. I may state here that, while on some of the more high-priced cars on the market today, means in the form of oil or grease-cups, requiring more or less constant attention and frequently repeated filling, are provided for the lubrication of the shaft-bearing 8, such means are totally absent from the standard lower-priced cars and that practically in all cars on the market today no means of any kind are provided for the proper lubrication of the clutch-sleeve and lever connection, with the result that the same wear more or less quickly and are a prolific source of trouble and expense.

Apertured centrally to accommodate the shaft 2 and sleeve 3 and located, as shown, within the housing 7 intermediate the lever-connection 6 and drum 1, is a septum or partition 9 preferably integral at its margin with, or otherwise rigidly fixed to, the casing-wall 7. This wall or partition 9 forms with wall 7 a well or basin 10 adapted to contain lubricant. Leading into the lubricant-well or basin 10, is a conveniently accessible filling-elbow 11 provided preferably with a screw-plug closure 12.

Formed in the bearing-member 8" and opening into chamber or well 10, is an annular recess 13 having preferably direct communication through ducts 14—14 with the bearing 8.

The basin 10 completely surrounds, as will be noted, the operating connection 6 between the clutch-sleeve 3 and lever 5 and is adapted to contain the lubricant to approximately the level of the mouth of filling-elbow 11, and thus in a simple and inexpensive, but efficient manner, I provide both the clutch operating mechanism and shaft-bearing 8 with a lubricating system of the splash type and am consequently enabled to maintain both such mechanism and bearing in an efficiently operating lubricated condition not only with convenience, but without constant care and attention, the well or basin 10 requiring refilling only at extended periods.

Located in the base or bottom of the well or basin 10, is an opening, as at 15, suitably closed by a removable plug or other closure 16, for draining the basin whenever desired or found necessary.

With reference now to the type of so-called combined gear-clutch and transmission-housing construction illustrated in Figure 3, in which the standard lubricant-containing transmission-housing proper 17 is bolted or otherwise fixed, as at 18, to the clutch-casing end-wall 7', and in which construction the casing-wall 7' is likewise apertured or cut-away, as at 19, to accommodate the shaft 2 and seat the shaft-bearing 8', the casing wall 7' is provided or formed, preferably as an integral part, with a septum or partition 9' suitably apertured, as shown, to accommodate the shaft 2 and clutch-sleeve 3, and which similarly forms with wall 7' a supplemental lubricant-well or basin 10' around the shaft-bearing 8' and the clutch-sleeve and lever operating-connection 6, the well or basin 10' having filling communication with the transmission well through a duct or passage 20 formed, as shown, in the casing-wall 7.'

Thus, again, in a simple and inexpensive manner, the clutch-operating-mechanism and shaft-bearing 8' are maintained with a minimum of care and attention in an efficiently operating splash lubricated condition, the attendant wear and troubles of insufficient lubrication, as well as the use of oil or grease-cups and their incidental constant inspection and refilling, being entirely obviated.

To prevent leakage of oil or other lubricant from the wells 10 or 10' along the shaft 2 into the clutch-drum 1, a packed gland, as at 21, may be provided around the shaft 2 at the shaft-accommodating aperture in the well-forming walls 9 or 9', as illustrated in Figure 3.

I am aware that changes in the form, construction, arrangement, and combination of the several parts of my new lubricating means may be made and substituted for those herein shown and described without departing from the nature and principle of my invention.

Having thus described my invention, what I claim and desire to secure by Letters Patent is:

1. The combination, in an automobile, with the clutch mechanism proper and its connected actuating sleeve-and-lever, and the housing enclosing the sleeve-and-lever connection, of a partition-wall attached to the housing-wall and forming with the housing wall a lubricant-containing well for the splash lubrication of such sleeve-and-lever connection.

2. The combination, in an automobile, with the clutch mechanism proper and its connected actuating sleeve-and-lever connection, the transmission-shaft and its bearing and the housing enclosing the sleeve-and-lever connection, of a partition-wall attached to the housing-wall and forming with the housing-wall a lubricant-containing well for the splash lubrication of both said bearing and said sleeve-and-lever connection.

3. The combination, in an automobile, with the clutch mechanism proper and its connected actuating sleeve-and-lever, the transmission-shaft and its bearing, and the housing enclosing the sleeve-and-lever connection, of a partition-wall disposed within and fixed to the housing-wall, said partition-wall forming with the housing-wall a lubricant-containing well for the splash lubrication of both said bearing and said sleeve-and-lever connection.

4. The combination, in an automobile, with the clutch mechanism proper and its connected actuating sleeve-and-lever, the transmission-shaft and its bearing, and the housing enclosing the sleeve-and-lever connection, of a partition-wall disposed within and fixed to the wall of the housing intermediate the clutch-mechanism proper and its said actuating sleeve-and-lever connection, said partition wall forming with the wall of the housing a lubricant-containing well surrounding said sleeve-and-lever connection for the splash lubrication of both said bearing and said sleeve-and-lever connection.

5. The combination, in an automobile, with the clutch mechanism proper and its connected actuating sleeve-and-lever, the clutch-housing enclosing said sleeve-and-lever connection, the transmission shaft and its bearing, and the transmission-housing, of a partition-wall disposed within and fixed to the clutch-housing intermediate the clutch-mechanism proper and its said actuating sleeve-and-lever connection, said partition-wall forming with the clutch-housing wall a lubricant-containing well for the splash lubrication of both said bearing and said sleeve-and-lever connection, said well having a filling opening leading from the transmission-housing.

In witness whereof, I have signed my name to this specification.

VALENTINE C. KLOEPPER.